Patented Feb. 23, 1943

2,312,297

UNITED STATES PATENT OFFICE 2,312,297

PROCESS FOR EXTRACTING BERYLLIUM COMPOUNDS FROM SILICATE MINERALS

Henry C. Kawecki, Temple, Pa., assignor, by mesne assignments, to Reconstruction Finance Corporation, New York, N. Y., a corporation of the United States No Drawing. Application April 8, 1941, Serial No. 387,448

11 Claims. (Cl. 23—22)

Beryllium occurs in nature in a number of minerals, however, only beryl (a beryllium aluminum silicate) is common enough to be of commercial importance. Due to the low atomic weight of beryllium, and the small percentage of BeO in average beryl (10% to 12%), an extraction process, in order to be economically practical, must either use very cheap chemicals or the process must provide for a recovery and re-use of the chemicals or conversion of the same into by-products, the sale of which lowers the operation cost of the process.

One of the objects of the present invention is to provide an economically practical method for the extraction of the beryllium content from beryllium-containing ores, residues and the like.

Another object is to provide an improved method of processing beryl ore for the recovery therefrom of the beryllium content thereof.

Still another object is to provide a cyclic process for the economical extraction of beryllium as beryllium oxide from beryl ore.

Other objects and advantages will be apparent as the invention is more fully hereinafter disclosed.

In accordance with these objects I have found that by roasting or heating finely pulverized beryl intimately mixed with sodium ferric fluoride, $Na_3FeF_6$, the beryllium content in the ore is converted into a water-soluble double fluoride of sodium and beryllium according to the following reaction:

(1) 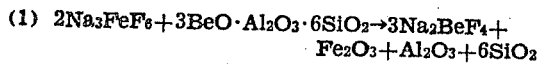

The roasting reaction is best carried out at a temperature of 650° C. to 800° C. for one to two hours. This can be done, for example, in a muffle furnace or a rotary kiln. The roasted material is allowed to cool and is then crushed and ground to relatively small particle size and is leached in a volume of cold water approximately sufficient to give a solution having a beryllium concentration of two to five grams per liter (expressed as BeO). The insoluble material consisting mainly of silica, alumina, and ferric oxide is separated from this solution and may be treated with sulphuric acid, if desired, to recover ferric sulfate, aluminum sulfate, and any beryllium fluoride compounds contained therein. However, I find that this recovery step usually is not necessary and is not essential to the economic practice of the present invention.

To the clear solution of sodium beryllium fluoride above described, sodium hydroxide is added, which precipitates the beryllium content of the solution as beryllium hydroxide, leaving sodium fluoride in solution. It is preferable to add the required amount of sodium hydroxide first to a small quantity of the beryllium-containing solution and then add the remainder of the beryllium-containing solution slowly thereto maintaining the strongly alkaline solution at a temperature above about 90° C. during this latter addition. This results in the formation of a granular beryllium hydroxide which is more easily filtered and washed than is the beryllium hydroxide obtained under other conditions.

The beryllium hydroxide thus obtained is separated from the sodium fluoride-containing solution, washed and is calcined or heated to a red heat, whereby it loses water and is converted to the oxide.

The alkaline sodium fluoride solution above obtained may be treated for the recovery of the fluoride content thereof, by reducing the alkalinity thereof to a pH of about four (4) by the addition of sulfuric acid thereto in the desired amount following which a concentrated solution of a ferric salt, such as ferric sulfate, may be added to convert the fluoride content thereof into an insoluble sodium ferric fluoride precipitate. Sodium sulfate remains in solution according to the following reaction:

(2) 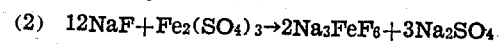

The sodium ferric fluoride precipitate is recovered from the solution, as by filtering, and the sodium sulfate content of the solution can be recovered therefrom in any suitable manner, as by evaporation. The recovery of the sodium sulfate is not essential for the economic practice of the present invention and may be dispensed with if desired. The cake of sodium ferric fluoride separated from the solution, however, mixed with beryl ore may be subjected to roasting as hereinabove disclosed in the first step of this invention. In the return of the sodium ferric fluoride precipitate to the process, the precipitate may be dried and mixed dry with the ore or alternatively may be mixed while wet with the ore to form a wet dough-like mixture which can easily be briquetted for charging into the roasting furnace. This latter alternative is preferred.

The recovery of beryllium from the ore by the practice of the above described method approximates 90% of the theoretical yield where the sodium ferric fluoride is employed in the amounts indicated in Equation (1). The recovery of the fluorine content of the mixture in accordance with Equation (2) however, usually approximates about 60%. The addition of a proportion of an alkali metal oxide to the ore-double fluoride mixture given in Equation (1) in amounts up to about 25% (by weight) appears to increase the recovery of the beryllium and also to increase the fluorine recovery materially.

The reason for this increase in the beryllium and fluorine recoveries in the presence of an alkali metal base is not apparent. However, in the presence of such basic compounds, the roasting appears to result in the formation of basic beryllium double fluorides having a greater solubility in water than the normal beryllium double fluoride.

The addition of alkali metal basic compounds to the ore-double fluoride mixture also permits the use of less double fluoride than called for in Equation (1) without substantially lowering the beryllium recovery. In general, I have found that the double fluoride may be lowered as much as 20% and replaced by an equivalent weight of alkali metal base without substantially lowering the beryllium recovery and with substantial increase in fluorine recovery. The best results, however, appear to be obtained where the alkali metal base addition irrespective of the double fluoride content of the mixture is maintained within the range 15 to 20% based on the beryllium oxide content of the mixture. The double fluoride content of the mixture then can be lowered as much as 20% without substantial lowering of the beryllium oxide recovery and with relatively high fluorine yields as compared with that obtained in the roast of Equation (1).

The fluoride loss can be made up in a plurality of different ways. Additional sodium ferric fluoride may be supplied to the system by making up a synthetic solution of sodium fluoride and precipitating with ferric sulfate according to Equation (2); or a portion of the beryl ore may be roasted with sodium fluosilicate, according to the well known process of Copaux, in which case a solution of sodium fluoride results in the end, from which I can make sodium ferric fluoride; alternatively, and preferably, fluospar (calcium fluoride) is digested with ferric sulfate solution forming a solution of ferric fluorosulfonate, which when added to sodium fluoride solutions precipitates sodium ferric fluoride. A number of other methods or processes for the economical production of sodium ferric fluoride to replace the fluoride losses in the process of the present invention will occur to one skilled in the art.

As an example, but not as a limitation of the practice of the present invention, the following specific embodiment thereof is given:

An intimate mixture comprised of 235 lbs. of finely pulverized beryl ore (containing 10.62% BeO) and 159.35 lbs. of sodium ferric fluoride (dry weight) is first formed, compacted into briquets and the briquets are heated for from one to two hours to a temperature approximating 750° C.

The roasted material is crushed in a jaw-crusher, and is then ground with water into a fine powder slurry in a rotary pebble mill. The slurry is then diluted to 1000 gallons with cold water, and is filtered and washed. About 200 gallons of the filtrate (containing the sodium beryllium fluoride) is run into a tank equipped with an agitator and steam-heating coils, and 80 lbs. of caustic soda are added thereto and the solution is agitated until the caustic soda is completely dissolved. The alkaline solution is heated to a temperature approximating 95° C., and the remaining 800 gallons of the beryllium-containing filtrate are slowly added thereto, and the temperature of the mixture of solution being maintained at 95° C., during the mixing process. The pH of the mixed solutions is then adjusted to a pH of about 12, either by adding more caustic alkali or by adding more beryllium-containing solution from a reserve tank. The precipitated beryllium hydroxide is recovered from the solution, preferably by filtering in a plate-and-frame press, and the cake of beryllium hydroxide obtained is washed thoroughly with water and is placed in a brick reverberatory type of furnace and heated slowly up to a red heat. The yield of beryllium oxide obtained by the above described process approximates 22½ lbs., which is about 90% of the theoretical BeO content of the amount of beryl ore employed.

The alkaline filtrate is run into a tank fitted with an agitator and the pH of the solution is adjusted by appropriate additions of sulfuric acid to a pH of about 4 and a 35% ferric sulfate solution is then slowly added to the solution, while thoroughly agitating the same, in total amount necessary to precipitate all the fluorine content thereof as sodium ferric fluoride. The end-point is determined by adding a little potassium thiocyanate to a small quantity of the solution. A red coloration indicates that ferric sulfate in excess of the amount required to precipitate the fluoride has been added. Care must be taken not to add an excess of ferric sulfate as an excess of ferric sulphate will re-dissolve the precipitate. The solution is allowed to stand for half an hour to permit the sodium ferric fluoride precipitate to settle to the bottom of the tank and the clear sodium sulfate solution on top is decanted and discarded. The precipitate is agitated to bring the precipitate into suspension in the remaining solution and is run into a filter press wherein it is washed free of this remaining solution. The filter cake obtained may be dried or may be used wet in forming the ore-flucride mixture for roasting in the first step of the process.

In the specific embodiment above given, I may lower the amount of sodium ferric fluoride given to about 127.5 lbs. and add thereto about 17.68 lbs. of soda ash or anhydrous sodium carbonate. With this mixture the recovery of fluoride from the alkaline sodium fluoride solution precipitated as sodium ferric fluoride is materially higher (approximating 80% as contrasted to 60% without the carbonate) with substantially no change in recovery of beryllium.

Although in the above description of the present invention I have described only the use of sodium ferric fluoride, I am not to be construed as limited thereto as any alkali metal or ammonium ferric fluoride can be employed in place of the sodium ferric fluoride specified. For example, the roasting mixture may be comprised of beryl ore, potassium ferric fluoride and potassium carbonate; and the first leach solution may be precipitated with potassium hydroxide, if desired. Likewise, instead of sodium carbonate, I can use any alkali metal carbonate, hydroxide or any other alkali metal salts which during the roasting will decompose to an alkali metal oxide. In place of sodium ferric fluoride I may employ any alkali metal heavy metal double fluoride, the heavy metal constituent of which, like iron, forms low solubility double fluoride compounds with alkali fluoride compounds. Sodium ferric fluoride, however, is preferred as being the most economically practical alkali metal-heavy metal double fluoride compound for the practice of the present invention.

Having hereinabove described the present invention generically and specifically and given a specific embodiment of the practice of the same, it is believed apparent that the same may be widely varied without essential departure therefrom and all such departures and modifications are contemplated as may fall within the scope of the following claims.

What I claim is:

1. The method of converting the beryllium content of beryllium containing ores, residues and the like, into alkali metal double fluoride compounds, which comprises mixing the said ore in finely divided condition with an alkali metal double fluoride compound of iron, and subjecting the mixture to a roasting treatment at an elevated temperature for a length of time at least sufficient to effect a double decomposition of said ore and double fluoride.

2. The method of claim 1, wherein a proportion of an alkali metal basic compound is incorporated in said ore and double fluoride mixture.

3. The method of converting the beryllium content of beryllium containing ores, residues and the like, into alkali metal double fluoride compounds, which comprises mixing the said ore in finely divided condition with a sodium ferric fluoride, and subjecting the mixture to a roasting treatment at an elevated temperature for a length of time at least sufficient to effect a double decomposition of said ore and double fluoride.

4. The method of claim 3, wherein a proportion of an alkali metal basic compound is incorporated in said ore and double fluoride mixture.

5. The method of converting the beryllium content of beryl ore into a water soluble double fluoride compound of an alkali metal which comprises mixing the ore in finely divided condition with sodium ferric fluoride in the proportions of two molecules of double fluoride to three molecules of beryllium oxide contained in the ore, and heating this mixture at a temperature within the range of 650° C. to 800° C. for a period of one to two hours.

6. The method of claim 5, wherein the amount of sodium ferric fluoride is decreased up to 20% below the amount specified, and an alkali metal basic compound is added to the mixture to an amount approximating 15 to 20% of the beryllium oxide content of the ore.

7. The method of claim 5, wherein the amount of sodium ferric fluoride is 80% of the amount indicated, and an alkali metal carbonate compound is added to the mixture in an amount approximating 15 to 20% of the beryllium oxide content of the ore.

8. In the manufacture of beryllium oxide from Be-containing silicate ores, the method which comprises mixing the ore with sodium ferric fluoride each in finely divided condition in the relative proportions of two molecules of $Na_3FeF_6$ to one molecule of $3BeO \cdot Al_2O_3 \cdot 6SiO_2$ heating said mixture to elevated temperatures approximating 750° C. for a prolonged time interval, finely subdividing the heated mixture and leaching the same in a volume of cold water approximately sufficient to provide a BeO concentration up to five grams per liter therein, separating the solution from the insolubles, adding caustic alkali to the said solution, in an amount at least sufficient to precipitate the beryllium content thereof as beryllium hydroxide, separating the precipitated beryllium hydroxide from the alkaline solution and heating the precipitate to temperatures approximating red heat to dehydrate the same.

9. The method of claim 8, wherein the solution after separating the precipitated beryllium hydroxide therefrom is acidified to a pH of about 4, and is treated with a solution of ferric sulfate until approximately all of the fluorine content thereof is precipitated as sodium ferric fluoride and wherein the sodium ferric fluoride is recovered from the solution and is returned to the first step of the process for mixture with said ore.

10. The method of claim 8, wherein the said solution after separating the insolubles therefrom is divided into two portions, one considerably larger than the other and wherein caustic alkali is first added to the smaller portion in total amount required to precipitate all of the beryllium content of both said portions and wherein the larger said portion is added at a relatively slow rate to the smaller said portion containing the said caustic alkali while the temperature of said smaller portion is maintained at approximately 95° C., and wherein the pH of the final mixture solution is adjusted to about 12 before filtering the precipitated Be hydroxide from the solution.

11. The method of claim 8, wherein the amount of sodium ferric fluoride is 80% of the amount indicated, and sodium carbonate is added to the mixture in an amount approximating 15 to 20% of the beryllium oxide content of the ore.

H. C. KAWECKI.